United States Patent
Taniyama et al.

(10) Patent No.: US 8,221,688 B2
(45) Date of Patent: Jul. 17, 2012

(54) EXHAUST GAS PURIFICATION DEVICE FOR INTERNAL COMBUSTION ENGINE

(75) Inventors: Koichi Taniyama, Okazaki (JP); Hiroshi Tanada, Nagoya (JP); Mayuko Suwa, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 900 days.

(21) Appl. No.: 12/323,163

(22) Filed: Nov. 25, 2008

(65) Prior Publication Data

US 2009/0246100 A1    Oct. 1, 2009

(30) Foreign Application Priority Data

Mar. 27, 2008    (JP) ................................ P.2008-083406

(51) Int. Cl.
*B01D 53/92* (2006.01)
(52) U.S. Cl. ............... 422/180; 502/527.12; 502/527.16
(58) Field of Classification Search .................. 422/180, 422/222, 312; 502/527.12, 527.16
See application file for complete search history.

(56) References Cited

U.S. PATENT DOCUMENTS

| | | | |
|---|---|---|---|
| 4,548,912 A | 10/1985 | Hettinger et al. | |
| 4,637,990 A | 1/1987 | Torobin | |
| 6,230,489 B1 * | 5/2001 | Tsuzuki et al. | 422/177 |
| 6,518,213 B1 | 2/2003 | Yamamoto et al. | |
| 7,446,076 B2 * | 11/2008 | Miyoshi et al. | 502/303 |
| 2006/0228274 A1 * | 10/2006 | Okada | 422/177 |

FOREIGN PATENT DOCUMENTS

| | | |
|---|---|---|
| EP | 1 270 887 A2 | 1/2003 |
| JP | 2002-138816 A | 5/2002 |
| JP | 2002-233755 A | 8/2002 |
| JP | 2004-9029 A | 1/2004 |
| JP | 2006-159159 A | 6/2006 |

OTHER PUBLICATIONS

Machine translation of JP 2002-138816, 7 pages.*

* cited by examiner

*Primary Examiner* — Jill Warden
*Assistant Examiner* — Joye L Woodard
(74) *Attorney, Agent, or Firm* — Birch, Stewart, Kolasch & Birch, LLP

(57) ABSTRACT

An exhaust gas purification device for an internal combustion engine is provided in an exhaust passage of the internal combustion engine. The exhaust gas purification device includes an HC trapping converter comprising a carrier; an HC adsorbing layer, supported on the carrier and adapted to adsorb unburned fuel; and a ternary catalyst layer, supported on a surface of the HC adsorbing layer and adapted to oxidize and remove the unburned fuel. The HC adsorbing layer includes particulate HC adsorbents each of which has a follow space and which are stacked. The ternary catalyst layer covers the HC absorbing layer such that a thickness of the ternary catalyst layer increases from an upstream side to a downstream side of the converter in the direction of exhaust gas flow.

8 Claims, 3 Drawing Sheets

EXHAUST GAS PURIFICATION DEVICE FOR INTERNAL COMBUSTION ENGINE

BACKGROUND OF THE INVENTION

1. Field of the Invention

The present invention relates to an exhaust gas purification device for an internal combustion engine. Specifically, it relates to a structure of an HC trapping catalyst that adsorbs and purifies unburned fuel (RC) in exhaust gas.

2. Description of the Related Art

In an exhaust passage of an internal combustion engine, a ternary catalyst for removing HC, CO, and NOx has been widely adopted. Since the capacity of the ternary catalyst remarkably decreases at low temperature, as exhaust gas purification devices, those further comprising an HC trapping catalyst provided in the exhaust passage have been increasingly employed.

The HC trapping catalyst comprises an HC adsorbing layer, which adsorbs HC at low temperature and discharges HC at high temperature, and a ternary catalyst layer and has a function of preventing discharge of HC which cannot be removed in the ternary catalyst at cold starting of the internal combustion engine, the function being achieved by oxidative removal of HC, which has been adsorbed in the HC adsorbing layer at low temperature, in the ternary catalyst layer at high temperature (refer to JP-A-2004-9029).

However, in the HC trapping catalyst as described above, the ternary catalyst layer is formed on the HC adsorbing layer and the HC adsorbing layer is in close contact with the ternary catalyst layer, so that the HC adsorbing layer is heated and its temperature is steeply elevated when the oxidation of HC starts in the ternary catalyst layer. Accordingly, HC adsorbed in a large amount immediately after the cold starting is rapidly discharged from the HC adsorbing layer and thus there is a possibility that HC is not completely oxidized in the ternary catalyst layer and is discharged from the HC trapping catalyst.

SUMMARY OF THE INVENTION

It is therefore an object of the invention to provide an exhaust gas purification device for an internal combustion engine, which hardly elevates the temperature of the HC adsorbing layer even when HC is oxidized and heat is generated in the ternary catalyst layer and suppresses the discharge of HC at the cold starting.

In order to achieve the object, according to the invention, there is provided an exhaust gas purification device for an internal combustion engine, provided in an exhaust passage of the internal combustion engine, the exhaust gas purification device comprising:

a carrier;

an HC adsorbing layer, supported on the carrier and adapted to adsorb unburned fuel; and a ternary catalyst layer, supported on a surface of the HC adsorbing layer and adapted to oxidize and remove the unburned fuel, wherein the HC adsorbing layer includes particulate HC adsorbents each of which has a follow space and which are stacked.

Each of the HC adsorbents may comprise an opening part communicating the hollow space and outside, and an inner diameter of each of the HC adsorbents and an aperture diameter of the opening part may be larger than a molecular diameter of the unburned fuel in exhaust gas.

The aperture diameter of the opening part may be 3 nm to 100 nm.

Each of the HC adsorbents may support a noble metal catalyst.

Each of the HC adsorbents may have a void content of 80% to 95%.

Each of the HC adsorbents may be composed of zeolite.

Each of the HC adsorbents may have a specific surface area of more than 200 m$^2$/g.

DETAILED DESCRIPTION OF THE INVENTION

The following will describe an embodiment of the invention based on drawings.

Figure 1:
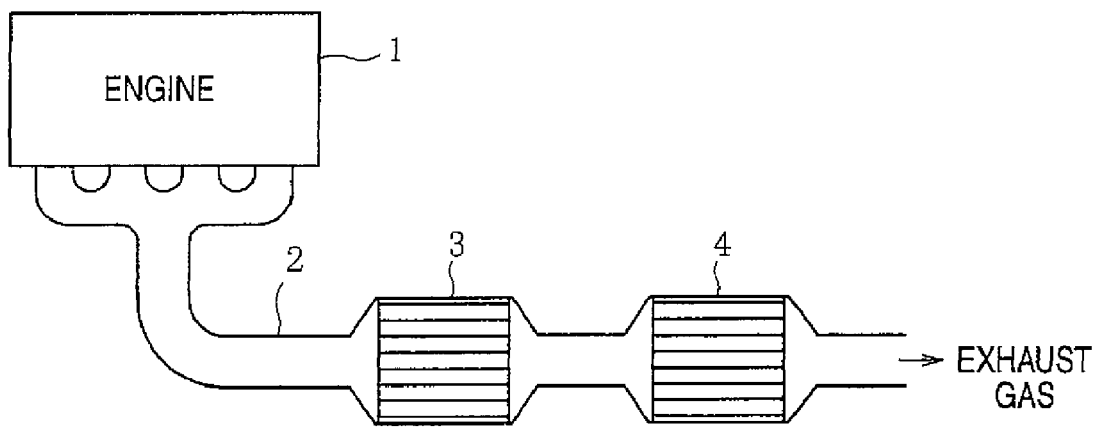
FIG. 1 is a schematic block diagram of an exhaust system of an engine to which an exhaust gas purification device of the invention is applied.

FIG. 1 is a schematic block diagram of an exhaust system of an engine (internal combustion engine) to which an exhaust gas purification device of the invention is applied.

The engine 1 is a gasoline engine and a ternary catalyst 3 (ternary converter) and an HC trapping catalyst 4 (HC trapping converter) as one embodiment of the exhaust gas purification device of the invention are fixed along an exhaust tube (exhaust passage) 2 of the engine. The ternary catalyst 3 contains any of platinum (Pt), rhodium (Rh), palladium (Pd), copper (Cu), silver (Ag), and iridium (Ir) on a carrier as a noble metal catalyst and has a function of removing HC, CO, and NOx in an active state.

Figure 2:
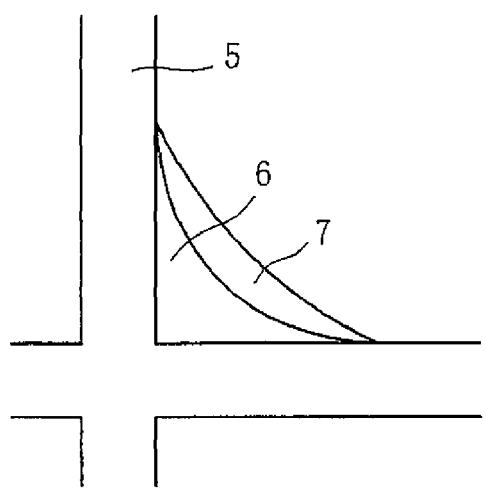
FIG. 2 is an enlarged view of an HC trapping catalyst.

FIG. 2 is an enlarged view of the HC trapping catalyst 4.

As shown in FIG. 2, the HC trapping catalyst 4 is formed by applying an HC adsorbing layer 6 as a coating on a carrier 5 formed of a honeycomb monolith (cordierite) or a metal and further applying a ternary catalyst layer 7 as a coating on the HC adsorbing layer 6.

The ternary catalyst layer 7 contains a noble metal catalyst as the above ternary catalyst 3 and has a function of removing HC along with CO and NOx. The ternary catalyst layer 7 sufficiently exhibits its function in an activated state at a predetermined temperature or higher.

The HC adsorbing layer 6 contains zeolite as a main component and has properties of adsorbing HC in exhaust gas in a low-temperature region and, on the other hand, releasing the adsorbed HC in a high-temperature region. Namely, the HC adsorbing layer 6 plays a role of adsorbing HC in the exhaust gas to suppress the discharge of HC into the air in the case where an engine 1 is in a cold state, the discharged amount of HC is large, and the ternary catalyst 3 is not yet in an active state FIG. 3 is an enlarged view of the HC adsorbing layer 6 and the ternary catalyst layer 7.

Figure 3:
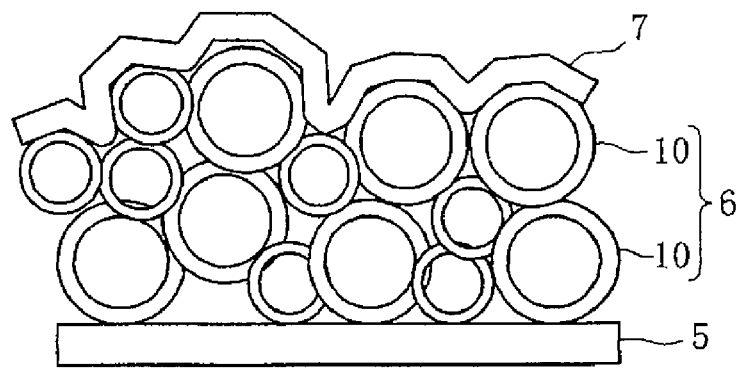
FIG. 3 is an enlarged view of an HC adsorbing layer and a ternary catalyst layer according to the present embodiment.

As shown in FIG. 3, the HC adsorbing layer 6 is formed by stacking plural pieces of the HC adsorbent 10, which is formed in a particulate shape, on the carrier 5. The ternary catalyst layer 7 is formed so as to cover the surface of the HC adsorbing layer 6 comprising the plural pieces of the HC adsorbent 10.

Figure 4:
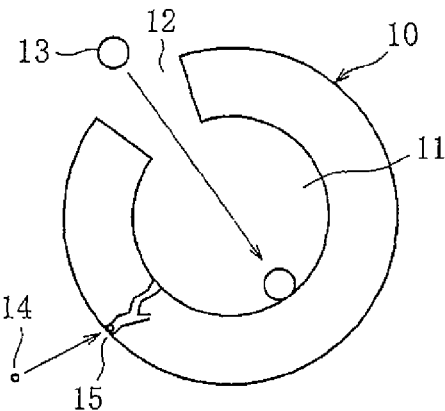
FIG. 4 is an enlarged structural drawing of an HC adsorbent according to the first embodiment.

FIG. 4 is an enlarged view of the HC adsorbent 10 according to the first embodiment of the invention.

As shown in FIG. 4, the HC adsorbent 10 has a hollow structure having an outer diameter of about 1 μm and a thickness of about 100 nm and at least one position of the wall has an opening part 12 communicating outside and an inner hollow space 11. The aperture diameter of the opening part 12 is formed so as to be about 3 to 10 nm that is larger than the molecular diameter of high-molecular-weight HC 13. The aperture diameter of the opening part 12 may be set at 3 nm or more so as not to disturb the transfer of HC into the hollow space 11 and may be set at 10 nm or less so that a turbulent flow of the exhaust gas does not intrude therein. Moreover, in the HC adsorbent 10, there are formed an infinite number of pores 15 having a pore size of about 1 nm into which low-molecular weight HC 14 can enter as a nature of material. The specific surface area of the HC adsorbent 10 is set at more than 200 $m^2/g$ when measured by BET method in order to secure the adsorption performance.

As a process for producing the HC adsorbent 10 having a hollow structure, for example, carbon or a spherical organic substance such as polyethylene may be mixed at the time when zeolite as a main component is baked. Thereby, particles where zeolite covers a periphery of the carbon or the spherical organic substance are formed. Furthermore, when only the inner carbon or spherical organic substance is burned and removed by suitably setting the burning temperature, the particulate HC adsorbent 10 having a hollow space 11 as shown in FIG. 4 can be easily produced.

In the HC trapping catalyst 4 having the above constitution, since the HC adsorbing layer 6 is formed by stacking the particulate HC adsorbent 10 having a hollow space 11, a large number of spaces are formed inside the HC adsorbing layer 6 and heat is hardly conducted in the HC adsorbing layer 6. The void content of the HC adsorbing layer 6 is suitably set at 80 to 95%. The void content is defined by the expression: bulk density D ($g/cm^3$)÷true density d ($g/cm^3$). The setting of the above numeral range is attributable to the fact that the thermal conductivity decreases as the void content increases but, when the void content is too high, the intrusion of the turbulent flow of the exhaust gas is not prevented and thus heat exchange easily occurs.

When such an HC trapping catalyst 4 is used as an exhaust gas purification device of the engine 1, the temperature of the HC adsorbing layer 6, especially the lower layer part is hardly elevated and the generation of a large amount of HC from the HC adsorbing layer 6 is suppressed even when HC is oxidized and heat is generated in the ternary catalyst layer 7 at the cold start of the engine 1. Therefore, at the cold starting of the engine 1, it becomes possible to sufficiently oxidize and remove HC in the ternary catalyst layer 7 and the discharge of HC from the HC trapping catalyst 4 can be suppressed.

Moreover, since the opening part 12 communicating the hollow space and outside is provided at the HC adsorbent, it becomes possible to adsorb HC on not only the outer wall but also the inner wall of the HC adsorbent and the adsorption efficiency can be increased. Particularly, even the high-molecular-weigh HC 13 having a large molecular diameter can be adsorbed on the inner wall of the HC adsorbent 10 by passing through the opening part 12. On the other hand, the low-molecular-weight HC 14 having a small molecular diameter can enter not only into the outer wall and inner wall of the HC adsorbent but also into the pores 15 formed inside the zeolite. Since the HC adsorbent 10 of the present embodiment has a hollow structure, the depth of the pores 15 is suppressed and also, since HC can enter into the pores 15 not only from the outside but also front the inside, the adsorption area can be increased through effective utilization of the pores 15 and thus the adsorption performance can be improved.

Figure 5:
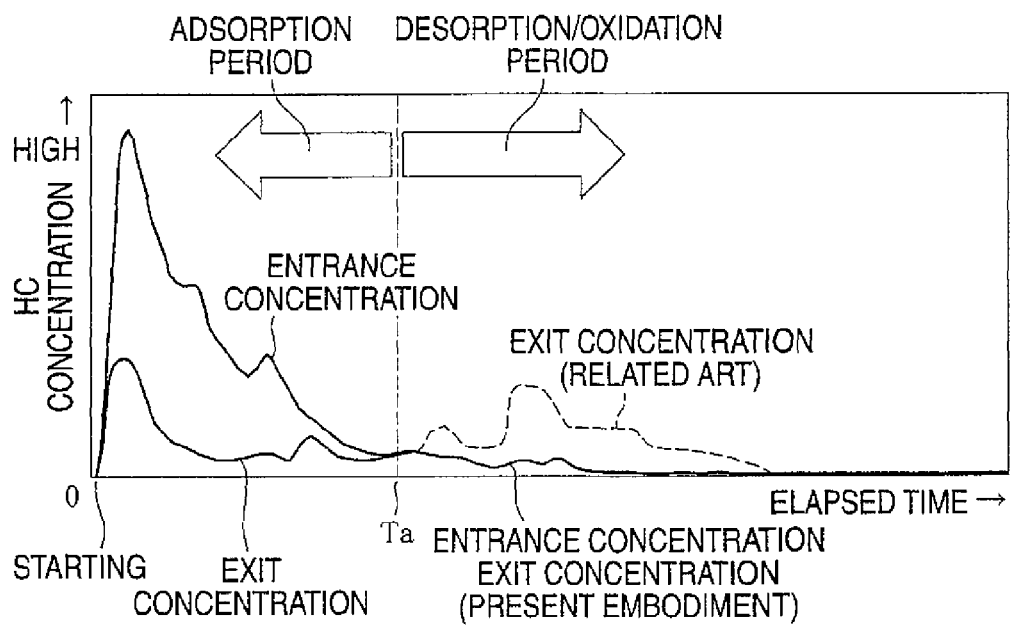
FIG. 5 is a graph showing one example of change in HC concentration at the entrance and exit of the HC trapping catalyst at cold starting.

FIG. 5 is a graph showing one example of change in HC concentration at the entrance and exit of the HC trapping catalyst 4 at the cold starting. In the figure, a solid line shows the HC concentration with the HC trapping catalyst 4 of the present embodiment, a dotted line shows the HC concentration with an HC trapping catalyst of related art where the HC adsorbent 10 has no hollow structure and has a simple layer shape.

As shown in FIG. 5, since the amount of HC discharged from the engine 1 is large immediately after the stating, HC concentration at the entrance of the HC trapping catalyst thus increases. A period from the start to a predetermined time Ta where the catalyst temperature is low, HC is adsorbed in both HC trapping catalysts of the present embodiment and the related art and the discharge of HC to the downstream is suppressed. However, after the predetermined time Ta from which the catalyst temperature is elevated, the discharge of HC increases in the case of the HC trapping catalyst of the related art but the discharge of HC is still suppressed in the case of the HC trapping catalyst 4 of the embodiment.

Figure 6:
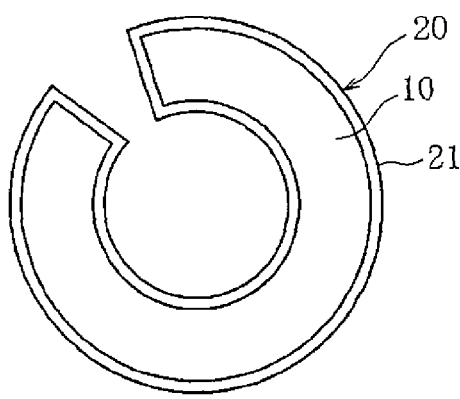
FIG. 6 is an enlarged structural drawing of all HC adsorbent according to the second embodiment of the invention.
Figure 7:
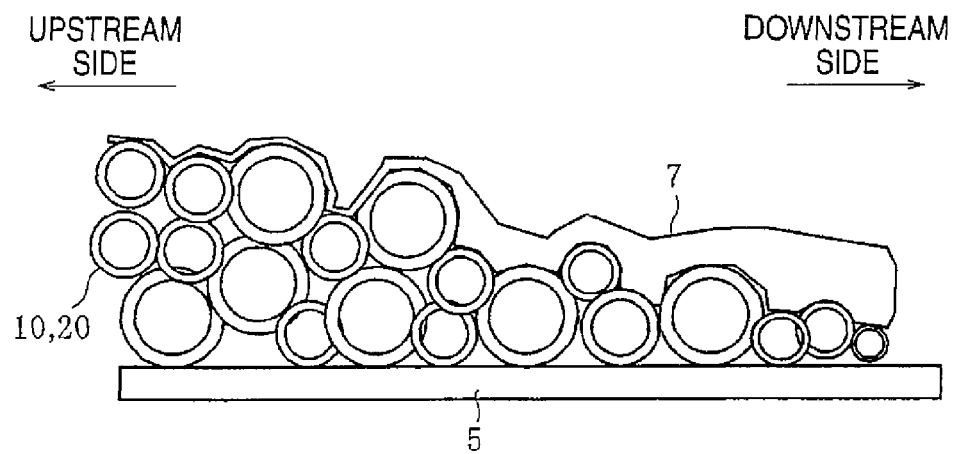
FIG. 7 is an enlarged cross-sectional view of another embodiment according to the invention.

FIG. 6 is a structural drawing of the HC adsorbent 20 according to the second embodiment of the invention. In the HC adsorbent 20 of the embodiment, a noble metal catalyst 21 such as platinum is further supported on the surface of the HC adsorbent 10 of the first embodiments. In this case, the noble metal catalyst 21 may be supported on the whole HC adsorbent. When the noble metal catalyst 21 is thus supported on the HC adsorbent, HC is oxidized and removed by the aid of the noble metal catalyst 21, so that the performance of removing HC can be improved.

The invention is not limited to the constitution wherein the ternary catalyst layer 7 uniformly covers the HC adsorbing layer 6 as shown in FIG. 3 and the ternary catalyst layer 7 nay cover the HC adsorbing layer 6 so that the thickness increases from the upstream side to the downstream side.

Figure 8:
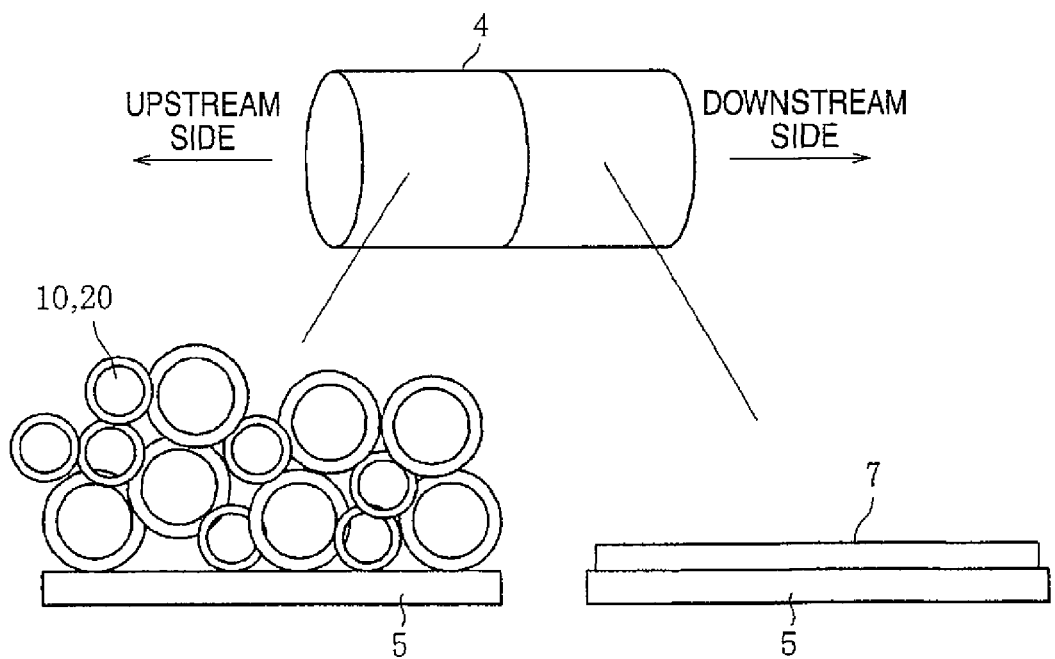
FIG. 8 is an enlarged cross-sectional view of the other embodiment according to the invention.

Moreover, as shown in FIG. 8, the HC trapping catalyst 4 may be a structure wherein the HC adsorbents 10 and 20 are placed at the upstream side and the ternary catalyst layer 7 is placed at the downstream side, separately.

According to an aspect of the invention, since the HC adsorbing layer is formed by stacking particulate HC adsorbents having a follow space, a large number of spaces are formed inside the HC adsorbing layer, so that heat conduction hardly occurs in the HC adsorbing layer. Therefore, even when HC is oxidized and heat is generated in the HC adsorbing layer at the cold starting of the internal combustion engine, the temperature of the HC adsorbing layer, especially an under layer thereof is hardly elevated and thus the discharge of HC from the HC adsorbing layer, as a result, from the exhaust gas purification device can be suppressed.

According to an aspect of the invention, since HC can flow into the hollow spaces through the opening part, HC can be adsorbed also on an inner wall of the HC adsorbing layer and hence adsorption performance of HC can be improved.

According to an aspect of the invention, the aperture diameter of 3 nm or more is advantageous for no disturbance of rapid transfer of unburned fuel molecules and the aperture diameter of 100 nm or less is advantageous for preventing intrusion of a turbulent flow of exhaust gas into the inside thereof, so that improvement of the amount of adsorbed HC in the HC adsorbing layer and suppression of the discharge of the adsorbed HC can be both achieved.

According to an aspect of the invention, HC is oxidized by the aid of a noble metal catalyst in the HC adsorbent and thus the performance of removing HC can be improved.

According to an aspect of the invention, by controlling the void content of the HC adsorbent to 80% to 95%, reduction of thermal conductivity and suppression of heat exchange by suppressing a turbulent flow of exhaust gas can be both achieved and thus the discharge of HC from the HC adsorbing layer, as a result, from the exhaust gas purification device can be suppressed. The void content herein is defined by the expression: bulk density D (g/cm$^3$)÷true density d (g/cm$^3$).

According to an aspect of the invention, an exhaust gas purification device durable even when exposed to exhaust gas of an automobile can be constituted by the use of zeolite as the HC adsorbent.

According to an aspect of the invention, the amount of adsorbed HC can be increased and thus the adsorption performance can be improved by controlling the surface area of the HC adsorbent to 200 m$^2$/g or more. The surface area of the HC adsorbent is defined by specific surface area measured by BET method.

What is claimed is:

1. An exhaust gas purification device for an internal combustion engine, provided in an exhaust passage of the internal combustion engine, the exhaust gas purification device comprising:
    an HC trapping converter including,
    a carrier;
    an HC adsorbing layer, supported on the carrier and adapted to adsorb unburned fuel; and
    a ternary catalyst layer, supported on a surface of the HC adsorbing layer and adapted to oxidize and remove the unburned fuel, wherein
    the HC adsorbing layer includes particulate HC adsorbents each of which has a hollow space and which are stacked, so as to suppress heat conduction therein, and
    the ternary catalyst layer covers the HC adsorbing layer such that a thickness of the ternary catalyst layer increases from an upstream side to a downstream side of the converter in the direction of exhaust gas flow.

2. The exhaust gas purification device according to claim 1, wherein
    each of the HC adsorbents comprises an opening part communicating the hollow space and outside, and
    an inner diameter of each of the HC adsorbents and an aperture diameter of the opening part are larger than a molecular diameter of the unburned fuel in exhaust gas.

3. The exhaust gas purification device according to claim 2, wherein the aperture diameter of the opening part is 3 nm to 100 nm.

4. The exhaust gas purification device according to claim 1, wherein each of the HC adsorbents supports a noble metal catalyst.

5. The exhaust gas purification device according to claim 1, wherein each of the HC adsorbents has a void content of 80% to 95%.

6. The exhaust gas purification device according to claim 1, wherein each of the HC adsorbents is composed of zeolite.

7. The exhaust gas purification device according to claim 1, wherein each of the HC adsorbents has a specific surface area of more than 200 m$^2$/g.

8. The exhaust gas purification device according to claim 1, further comprising
    a ternary converter capable of oxidative removal of HC, wherein the ternary converter and the HC trapping catalyst converter are provided in the exhaust passage in this order from the upstream side in the direction of exhaust gas flow.

* * * * *